(12) United States Patent
Fryer et al.

(10) Patent No.: US 8,698,978 B2
(45) Date of Patent: *Apr. 15, 2014

(54) ELECTROLUMINESCENT DISPLAYS

(75) Inventors: Christopher James Newton Fryer, Cottenham (GB); Richard Guy Blakesley, Cambridge (GB); William Frank Tyldesley, Diss (GB); Christopher Miles Evans, Saffron Walden (GB)

(73) Assignee: MFlex UK Limited, Cambridge (GB)

( * ) Notice: Subject to any disclaimer, the term of this patent is extended or adjusted under 35 U.S.C. 154(b) by 870 days.

This patent is subject to a terminal disclaimer.

(21) Appl. No.: 11/570,976

(22) PCT Filed: Jun. 10, 2005

(86) PCT No.: PCT/GB2005/002298
§ 371 (c)(1),
(2), (4) Date: Aug. 6, 2008

(87) PCT Pub. No.: WO2005/121878
PCT Pub. Date: Dec. 22, 2005

(65) Prior Publication Data
US 2008/0303981 A1  Dec. 11, 2008

(30) Foreign Application Priority Data
Jun. 11, 2004 (GB) .................................. 0413121.5

(51) Int. Cl.
*G02F 1/1335* (2006.01)
(52) U.S. Cl.
USPC ........................................................... 349/69

(58) Field of Classification Search
USPC ............................................................ 349/69
See application file for complete search history.

(56) References Cited

U.S. PATENT DOCUMENTS

| | | | |
|---|---|---|---|
| 4,469,381 A | 9/1984 | McGuffie | |
| 4,752,771 A | 6/1988 | Katogi et al. | |
| 5,115,329 A | 5/1992 | Ikarashi et al. | |
| 5,121,234 A | 6/1992 | Kucera et al. | |
| 5,353,133 A * | 10/1994 | Bernkopf | 349/5 |
| 5,559,402 A | 9/1996 | Corrigan, III | |
| 5,594,629 A | 1/1997 | Steigerwald | |
| 5,770,923 A | 6/1998 | Beard | |
| 5,861,719 A | 1/1999 | Koskowich et al. | |
| 6,069,804 A | 5/2000 | Ingman et al. | |
| 6,175,191 B1 | 1/2001 | Yamazaki | |

(Continued)

FOREIGN PATENT DOCUMENTS

| | | |
|---|---|---|
| EP | 0131635 | 1/1985 |
| EP | 0 699 015 A1 | 2/1996 |

(Continued)

OTHER PUBLICATIONS

Li Weiti, et al., Title: LCD, pp. 27-78, dated Mar. 31, 2000.

(Continued)

*Primary Examiner* — Timothy L Rude
(74) *Attorney, Agent, or Firm* — Keating & Bennett, LLP

(57) ABSTRACT

A display including an electroluminescent layer, a liquid crystal layer, and a first electrode and a second electrode arranged such that the electroluminescent layer and the liquid crystal layer are disposed between the first and second electrodes and arranged to apply an electric field across both the electroluminescent layer and the liquid crystal layer.

16 Claims, 1 Drawing Sheet

(56) References Cited

U.S. PATENT DOCUMENTS

| | | | |
|---|---|---|---|
| 6,433,476 B1 | 8/2002 | Paciorek et al. | |
| 6,842,170 B1 | 1/2005 | Akins et al. | |
| 6,924,873 B2 | 8/2005 | Asada | |
| 7,486,342 B2 * | 2/2009 | Mathey et al. | 349/16 |
| 7,649,595 B2 * | 1/2010 | Masutani et al. | 349/89 |
| 2002/0001052 A1 * | 1/2002 | Kornfield et al. | 349/88 |
| 2002/0113753 A1 * | 8/2002 | Sullivan et al. | 345/6 |
| 2002/0163606 A1 | 11/2002 | Kitai et al. | |
| 2004/0246431 A1 | 12/2004 | Asada | |
| 2007/0247066 A1 * | 10/2007 | Tokairin et al. | 313/506 |
| 2007/0258022 A1 | 11/2007 | Takechi et al. | |

FOREIGN PATENT DOCUMENTS

| | | | |
|---|---|---|---|
| EP | 1380879 | A1 | 1/2003 |
| EP | 1380879 | | 1/2004 |
| EP | 1731949 | | 12/2005 |
| GB | 2348039 | | 9/2000 |
| GB | 2359178 | | 8/2001 |
| JP | 4986034 | | 8/1974 |
| JP | S58115780 | U | 8/1983 |
| JP | 01-145086 | U | 10/1989 |
| JP | 05-036477 | A | 2/1993 |
| JP | 06-225546 | A | 8/1994 |
| JP | 08-083683 | A | 3/1996 |
| JP | 1138918 | | 2/1999 |
| JP | 11-204255 | A | 7/1999 |
| JP | 2000-030860 | A | 1/2000 |
| JP | 2000182769 | | 6/2000 |
| JP | 2000-243560 | A | 9/2000 |
| JP | 2003-338385 | | 11/2003 |
| JP | 2004-111175 | | 4/2004 |
| WO | 91/16722 | | 10/1991 |
| WO | 99/04604 | A1 | 7/1998 |
| WO | 9904604 | | 1/1999 |
| WO | 0231589 | | 4/2002 |
| WO | 02/093241 | A1 | 11/2002 |
| WO | 03083523 | | 10/2003 |
| WO | 2008/075001 | | 6/2008 |

OTHER PUBLICATIONS

Chinese Examination Report for App. No. 2005800257147, dated Sep. 1, 2008, pp. 1-10.

W. A. Thornton, Title: Electroluminescence in Zinc Sulfide, Physical Review, vol. 102, No. 1, dated Apr. 1, 1956, pp. 38-45.

F. A. Schwertz, et al., Title: Voltage-Dependence of Electroluminescent Brightness, I. Dielectric-Imbedded Phosphors, Letters to the Editor, dated Mar. 4, 1955, pp. 1133-1134.

UK Application No. 0805751.5 Search Report dated Jul. 28, 2008.

Kenneth R. Brown, Title: EP Application No. 05750278.3-2205 in the name of Pelikon Limited—Third Party Observations, dated Aug. 7, 2008, pp. 1-7.

EP Application No. 05750278, Office Action dated Jun. 5, 2009, pp. 1-4.

EP Application No. 05750278, Office Action dated Jan. 9, 2009, pp. 1-5.

Zhao et al., "Electroluminescent Displays", U.S. Appl. No. 12/413,096, filed Mar. 27, 2009.

Fryer, "Human Interface Device and Related Methods", U.S. Appl. No. 12/818,201, filed Jun. 18, 2010.

Caricchi et al., "Study of Bi-Directional Buck-Boost Converter Topologies for Application in Electrical Vehicle Motor Drives", Applied Power Electronics Conference and Exposition, 13th Annual Conference Proceedings, Feb. 15, 1998, pp. 287-293.

Official Communication issued in corresponding Japanese Patent Application No. 2002-568868, mailed on Nov. 11, 2008.

Official Communication issued in corresponding Chinese Patent Application No. 200580025714.7, mailed on Aug. 5, 2010.

Drzaic, P. S.; Title: "Polymer Dispersed Nematic Liquid Crystal for Large Area Displays and Light Valves"; Journal of Applied Physics, American Institute of Physics, NY, US, vol. 60, No. 6, Sep. 1, 1986, pp. 2142-2148.

Author: Drzaic, P.S.; Title: "Polymer dispersed nematic liquid crystal for large area displays and light valves"; Journ of Appl. Phys., American IoP, vol. 6, 1986, pp. 2142-2148.

Paul S. Drzaic, Title: Liquid Crystal Dispersions, 1995, pp. 1-429.

* cited by examiner

ELECTROLUMINESCENT DISPLAYS

TECHNICAL FIELD

This invention is concerned with displays, and relates in particular to electroluminescent displays, and more specifically to displays which are electroluminescent/liquid crystal hybrids.

BACKGROUND OF THE INVENTION

Certain materials are electroluminescent—that is, they emit light, and so glow, when an electric field is generated across them. The first known electroluminescent materials were inorganic particulate substances such as zinc sulphide, while more recently-found electroluminescent materials include a number of small-molecule organic emitters known as organic light emitting diodes (OLEDs) and some plastics—synthetic organic polymeric substances—known as light-emitting polymers (LEPs). Inorganic particulates, in a doped and encapsulated form, are still in use, particularly when mixed into a binder and applied to a substrate surface as a relatively thick layer; LEPs can be used both as particulate materials in a binder matrix or, with some advantages, on their own as a relatively thin continuous film.

This electroluminescent effect has been used in the construction of displays. In some types of these a large area of an electroluminescent (EL) material—generally referred to in this context as a phosphor—is provided to form a backlight which can be seen through a mask that defines whatever characters the display is to show. In other types there are instead individual small areas of EL material. Displays of either of these types have many applications; examples are a simple digital time and date display (to be used in a watch or clock), a mobile phone display, the control panel of a household device (such as a dishwasher or washing machine), and a handheld remote controller (for a television, video or DVD player, a digibox, stereo or music centre or similar entertainment device).

As noted above, the electroluminescent effect can be used to make a backlight that can shine through a mask defining a display. From front (the side from which it is to be viewed) to back such a backlight commonly consists of:

- a relatively thick protective electrically-insulating transparent front layer known as the substrate and made usually of a glass or a plastic such as polyethylene terephthalate (PET) or polyethylene naphthalate (PEN);
- over the entire rear face of the substrate, a relatively thin transparent electrically-conductive film made from a material such as indium tin oxide (ITO), this forming one electrode—the front electrode—of the backlight;
- covering the rear face of the front electrode, a relatively thin layer of electroluminescent phosphor material (usually a particulate phosphor within a binder matrix);
- over the rear face of the phosphor layer, a relatively thin electrically-insulating layer of a material—usually a ceramic—having a relatively high dielectric constant (relative permittivity) of around 50 (in some applications, such as the present invention, this layer is most desirably significantly optically-reflective, while in others it preferably has low reflectivity);
- covering the entire rear face of the electrically-insulating layer, a continuous electrically-conductive film, usually opaque (and typically carbon or silver), forming the other electrode—the back electrode—of the backlight.

In addition, the back electrode layer, which is quite delicate, is generally covered with a protective film (in some applications this is usually another, similar, ceramic layer, whereas in others—and in the present one—it is preferably a flexible polymeric material) to prevent the layer being damaged by contact with whatever device components—electronic circuitry, for example—might be mounted behind the display.

A number of techniques known to those skilled in the art may be used to construct such a device. However, each of the various layers is preferably screen-printed into place (apart from the ITO front electrode, which is usually sputtered onto the substrate), through masks that define the shape, size and position of the layer components, using suitable pastes that are subsequently dried, set or cured, commonly through the application of heat or ultraviolet light, as appropriate, prior to the next layer or collection of layers being applied. And in the context of electroluminescent displays, the expressions "relatively thick" and "relatively thin" mean thicknesses in the ranges, respectively, of 30 to 300 micrometers, usually around 100 micrometers, and 50 micrometers, and most usually 25 micrometers or less.

In a display, such a backlight is generally positioned behind a mask. Typically, such a mask is permanent—that is containing fixed, predefined, transmitting and blocking areas. The switching of such a display is controlled by turning the backlight, or sections thereof, on or off.

SUMMARY OF THE INVENTION

This invention provides, in a first aspect, an electroluminescent display of the type having a switchable electroluminescent (EL) material backlight mounted behind a mask defining the information to be displayed, in which display:
- the mask is constructed as a layer of physically-stabilised Liquid Crystal (LC) material switchable to define the information to be displayed; and
- the LC mask and the EL backlight are constructed as a single entity, the latter created as a layer mounted directly on/behind the layer of LC material.

The present invention essentially combines the two approaches of a mask and of individual small lit areas; as is explained in more detail hereinafter it proposes a display which is a combination of a liquid crystal (LC) possessing specific properties, which can be used to define a mask, selectable areas of which can be switched between transparent and opaque at will, together with an EL backlight which, unlike most backlights, is only activated (to emit light) under those areas of the LC mask which are at the time transparent.

Such a display—a combination of LC material and EL material—is for convenience referred to hereinafter as a "hybrid" display. It may be more specifically defined as one where a single substrate is used to carry firstly a layer of physically-stabilised LC material switchable to form a mask defining the information to be displayed, and secondly—and formed directly on the LC layer and viewable therethrough—an EL material layer switchable to act as a backlight for the display.

What the present invention proposes is that the mask itself should be switchable in individual areas, between "on"/transparent (so that the backlight can shine therethrough) and "off"/opaque (so that the backlight's light is blocked thereby). Moreover, the invention proposes that this switchable mask should be an LCD—Liquid Crystal Display—device that can be made transparent or opaque in the manner described. Furthermore, it is proposed that the LCD mask and the EL backlight be made as a hybrid—as a single entity made of both components supported one behind the other on a single substrate—the EL backlight being created as an electroluminescent material layer mounted directly on/behind the layer of LC material; from this it will be understood that it is essential that the LC material be in a physically-stabilised form rather than in the normal "liquid", mobile, form implied by its name.

In a second aspect of the invention there is provided an electroluminescent display of the type having a switchable electroluminescent (EL) material backlight mounted behind a mask defining the information to be displayed, in which display:

the mask is constructed as a layer of physically-stabilised Liquid Crystal (LC) material switchable to define the information to be displayed; and the LC mask and the EL backlight are constructed as a single entity.

While the LC mask can be created as a layer mounted directly on/behind the layer of LC material, it is possible to provide an insulating interlayer, typically comprising an insulating polymer, provided between the LC mask and EL backlight.

The interlayer is preferably substantially optically transparent, at least to those wavelengths of light emitted by the EL material, and is preferably electrically insulating. This "the" layer serves, if necessary, to provide increased cohesion between the two portions of the display. An additional benefit of this layer is, through control of its thickness, to adjust the voltage provided to the LC and EL materials and so optimise the overall performance of the display; the relative thickness of the layers of EL, LC and interlayer materials and their relative dielectric constants will control how much voltage is dropped across each layer.

The optional features that follow may be applied equally well to either of the first or second aspects of the invention, except where the context requires otherwise. In the case of either aspect, we have appreciated that EL and LC materials can be formed and driven together and as such the present display is both convenient to fabricate and to operate.

Furthermore, only the area of EL material behind a portion of LC material that is transmissive to light need be illuminated; this typically reduces the amount of EL material that requires illumination at any given time and as such can reduce the energy consumption of the display.

Using the same language as employed hereinabove to describe the structure of a conventional EL backlight, the structure of the hybrid display of the invention may—in a preferred aspect, at least—be similarly described from front to back as:

a relatively thick protective electrically-insulating transparent front layer (the substrate);

over at least part of the rear face of the substrate, possibly in an area-defining pattern, a relatively thin transparent electrically-conductive film forming one electrode(s)—the front electrode—of the display;

covering at least partially the rear face of the front electrode, a relatively thin layer of physically-stabilised liquid crystal material, this being switchable (between transmissive and opaque) to form the mask defining the information to be displayed;

optionally, formed directly on, and covering at least part of the rear face of, the liquid crystal layer a relatively thin optically transparent, electrically insulating layer to provide an interface between the two 'active' sections of the construction.

formed directly on, and covering at least part of the rear face of, the insulating layer, or if this layer is not present directly on, and covering the rear face of the liquid crystal layer, a relatively thin layer of electroluminescent/phosphor material;

over the rear face of the phosphor layer, a relatively thin optically—reflective electrically-insulating layer of a relatively high dielectric constant material; and disposed over at least part of the rear face of the reflective electrically-insulating layer, an electrically-conductive film (possibly in an area-defining pattern) forming the other electrode(s) of the display;

the front and rear electrodes together defining which areas of both the liquid crystal layer and the electroluminescent layer can be selected to be switched "on" or "off".

In addition, the back electrode layer may be covered with a protective film. The hybrid display of the invention may be for any purpose; a list of some purposes is given hereinabove by way of example.

Other than the fact of its mounting directly on the LC material mask, the display's electroluminescent (EL) backlight can be made in any appropriate way, and of any suitable materials. This is well known in the Art, is discussed generally hereinabove, and needs no further comment here. Even so it is probably worth making the following comments, which describe the most preferable embodiment.

The particulate phosphor used as the EL material can be an LEP in particulate form, but most preferably it is an inorganic material; a typical inorganic particulate phosphor is zinc sulphide, especially in the form of encapsulated particles (encapsulation provides substantially-increased stability and life).

Especially convenient zinc sulphide materials of this type are the Luxprint range of phosphors manufactured by DuPont or the Electralux product range manufactured by Electra Polymers and Chemicals Ltd. Typically a phosphor paste such as DuPont 8154B (High Bright Green) or Electra Electralux ELX-10 is applied to an ITO coated PET substrate and dried to give a layer approximately 25 micrometer thick.

As in the Art, the phosphor layer is covered or subsequently overprinted with an insulating layer (in the present invention this is desirably formed of an optically-reflective ceramic material). Such materials are available from a number of commercial suppliers and may be either thermally or UV cured. Typical materials that may be used comprise Dupont Luxprint 8153 (a thermally curable dielectric paste), DuPont Luxprint 5018 (a UV curable paste) and Electra Electralux ELX 80 (a thermally curable paste) and are applied as a layer around 10 to 15 micrometers thick.

Back electrodes are then formed on this insulating layer, by the deposition of a conducting ink or paste such as DuPont Luxprint 9145 (a thermally curable silver pigmented paste), Norcote ELG110 (a UV curable silver paste) or Electra Electralux ELX30 (a thermally curable silver paste) as a relatively thin layer—around 20 micrometer—where required.

Finally, the rear face of the display may then be protected with a thin—15 micrometer—ceramic insulating layer. Materials that may be used to fabricate this layer include DuPont 5018, as above, Coates UV600G UV Curable Coverlay or Electra Electralux ELX40.

In the "hybrid" display of the current invention the information-defining mask is constructed as a layer of physically-stabilised Liquid Crystal (LC) material that can be switched to transmit or block light output by the backlight as required. Though notionally the LC material might be any one of the main types of such material—such as twisted nematic and cholesteric or chiral nematic—the requirement is, generally, for a liquid-crystal-based material that allows polariserless high contrast electro-optical shuttering operation between a field "on" state that is fully transmissive and a base field "off"

state that is optically non-transmissive through absorption, reflection and/or scattering processes. Chiral nematic materials seem particularly appropriate; as now explained, they have special properties which are extremely well suited to the purpose of the invention. Thus, relatively-recent developments in Liquid Crystal technology have produced materials (such as Nematic Curvilinear Aligned Phase liquid crystals as manufactured by Raychem under the trade name NCAP or Dyed Chiral Nematic liquid crystals) which can act as an optical shutter; in one state they absorb incident light, white in another state they transmit it.

Using such a material, the combination of a liquid crystal shutter in front of an electroluminescent display results in a hybrid display which not only emits light when activated but also changes reflectivity when activated. This type of hybrid display can have good visibility in a very large range of lighting conditions—from pitch darkness to full sunlight (typically considered the highest ambient light condition).

There is another significant advantage related to chiral nematic materials: selection of a liquid crystal material which absorbs light in the absence of an electric field and transmits light when an electric field is present allows the same electric field to be used to drive the electroluminescent material as is used to drive the liquid crystal material. In the absence of an electric field, the liquid crystal material absorbs incident ambient light and the electroluminescent material does not generate any light so the display element appears dark. When an electric field is applied, the liquid crystal transmits both incident ambient light, which subsequently reflects back out off the electroluminescent layer behind it, and also the light now generated by the electroluminescent layer, so the display appears light.

Accordingly, the LC and EL materials may be controlled by a common pair of electrodes. This is particularly convenient due to its simplicity.

Liquid crystal shutter materials change state (from absorptive to transmissive) on the application of an AC electric field of the order of 1-10 kV/mm. Thick film electroluminescent materials emit light on the application of similar electric fields. It is possible, therefore, to connect the two display elements in series such that they effectively share the applied electric field. This series connection of the display elements can most conveniently be accomplished by applying a first layer of liquid crystal material to a transparent conductive substrate (such as ITO-coated PET or PEN) followed by a layer of electroluminescent material over the rear surface of the liquid crystal. It is desirable that the resultant display be flexible and pressure insensitive as is the case with a thick film electroluminescent display.

To this end, in the hybrid display of the invention the information-defining mask is constructed as a layer of physically-stabilised Liquid Crystal (LC) material—conveniently the liquid crystal material is dispersed or stabilised within a matrix structure that holds it in place. Such a stabilised liquid crystal is commonly referred to as a polymer-dispersed liquid crystal (PDLC) or as a polymer-stabilised liquid crystal (PSLC). A broad range of polymer materials is available for this purpose. One appropriate material is gelatine; the liquid crystal material can be combined with the gelatine, with appropriate solvents and additives, to produce a stable emulsion which can then be coated or screen-printed onto the (ITO-coated) substrate and subsequently dried. The electroluminescent phosphor material can then be applied to the reverse of the dried PDLC layer, followed by the other layers as described above.

Other materials, compatible with a number of polymer materials (such as Merck MXM035 or SAM114), can be used to create composite self-sustaining films suitable for typical print-production processes. The sustaining matrix may be created such that the liquid crystal is in a continuous phase (a Polymer Stabilised Liquid Crystal—PSLC—Kent Displays Incorporated) or the liquid crystal may be encapsulated in distinct droplets as in a polymer-dispersed device (a Polymer Dispersed Liquid Crystal—PDLC—Xymox NCAP, mentioned above).

Applied directly (conveniently by screen printing) to the LC layer is the phosphor of the EL layer and a reflective layer and a rear conductive layer are then sequentially applied on top of this phosphor layer, again conveniently using screen printing. The reflective layer can be produced using a high dielectric constant ceramic, such as barium-titanate-loaded ink. The rear conductor layer can be a silver- or carbon-loaded ink. It is also possible to combine the functions of the reflective and conducting layers by the use of a single silver loaded ink layer.

For the most part, a hybrid display of the invention most conveniently incorporates disposed over substantially the entire rear face of the substrate a single (front) electrode, and disposed over the rear face of the reflective electrically-insulating layer a patterned (rear) defining which areas of both the liquid crystal layer and the electroluminescent layer can be selected to be switched "on" or "off". However, it is possible as an alternative to pattern the front electrode and to have a single "whole-face" rear electrode. Moreover, it is possible for both electrodes to be patterned—as will need be the case if the display is going to be a matrix device where a multitude of very small areas can be illuminated at will so as to enable almost any shape and size of displayed image simply by selecting which areas are lit and which are dark.

The hybrid display of the invention incorporates a layer of switchable LC material to act as a mask in front of an EL material layer switchable to act as a backlight for the display. The switching is effected by control voltages applied to the electrodes positioned to the front and rear—the relatively thin transparent electrically-conductive film over the entire rear face of the substrate forming the front electrode, and the pattern of areas of electrically-conductive film disposed over the rear face of the reflective electrically-insulating layer forming the rear electrode(s). This one "pair" of front/back electrodes is used to switch both the LC material (from opaque to transparent, and back) and the EL material (from off/dark to on/light-emitting). Moreover, unlike in a more conventional EL backlight, where the EL layer is over its entire surface either "on" or "off" (light-emitting or dark), in the hybrid display the EL material is only switched "on" behind those LC material areas which are themselves switched "on" (transparent). This partial activation of the EL layer results in a significant power saving.

The relative thicknesses and dielectric constants of the LC material and electroluminescent material layers, and the insulating interlayer if used will determine how much of the total applied field (the voltage between the front and rear electrodes) appears across these respective layers. Their thickness can therefore be controlled to optimize display contrast ratio in various lighting conditions, and to minimise power consumption. Typically, a 5-10 micrometer layer of an LC material such as PDLC will be used in combination with a 20-40 micrometer electroluminescent material layer.

In the invention's hybrid display the EL material is applied directly to the rear of the LC material layer (with the possible inclusion of the interlayer discussed above), the combination being born by a single substrate with a single "pair" of activation electrodes. This single substrate display construction has significant advantages over other combinations of a light-emitting layer with a shutter layer. In particular, as the same electronic drive circuitry can most conveniently be used to power both the light-emitting EL layer and the mask-defining LC shutter layer the cost of the whole is substantially reduced over that of normal transflective LCD displays requiring a separate backlight. And, as noted above, for a segmented or matrix-style display, only the segments required to be of a light appearance are powered, whereas typically in a transflective LCD with a separate backlight the entire area of the display is lit at all times by the backlight with the LCD shutter blocking or transmitting light as appropriate. For the invention's hybrid, then, the result is improved contrast and reduced power consumption over these other displays.

These and other features of the present application will become apparent to one of ordinary skill in the art upon review of the following detailed description of the invention when taken in conjunction with the drawings and the appended claims.

BRIEF DESCRIPTION OF THE DRAWINGS

Two embodiments of the invention are now described, though by way of illustration only, with reference to the accompanying diagrammatic Drawings in which.

DETAILED DESCRIPTION OF THE INVENTION

Figure 1:
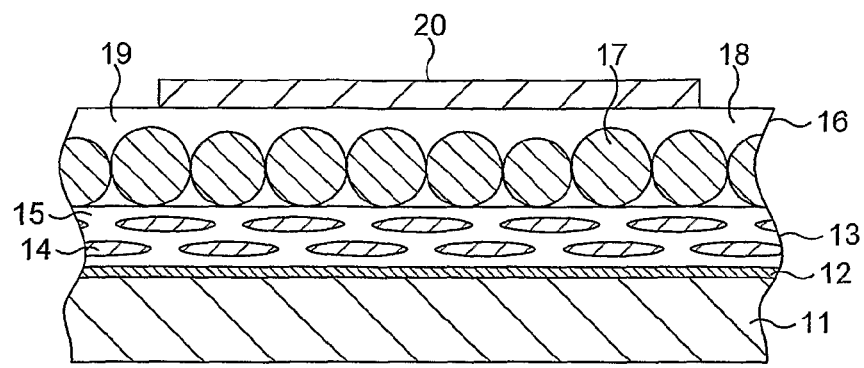
FIG. 1 shows a section through a hybrid LC/EL display according to a first embodiment of the invention.

The structure of the first embodiment of the display of the invention depicted in FIG. 1 of the accompanying drawings can be seen to be, from front to back:

- a relatively thick protective electrically-insulating transparent front layer (11; the substrate);
- over the rear face of the substrate 11, a relatively thin transparent electrically-conductive film (12) forming the front electrode of the display;
- covering the rear face of the front electrode 12, a relatively thin layer (13) of LC material (14) physically-stabilised by being dispersed within a supporting matrix (15);
- formed directly on, and covering the rear face of, the liquid crystal layer 13, a relatively thin layer (16) of electroluminescent/phosphor material (17) dispersed within a supporting matrix (18);
- over the rear face of the phosphor layer 16, a relatively thin optically-reflective electrically-insulating layer (19) of a relatively high dielectric constant material (in the Figure this layer is shown as a seamless extension of the phosphor layer 16); and
- disposed over the rear face of the reflective electrically-insulating layer 19, an electrically-conductive film (20) forming the rear electrode(s) of the display.

The front and rear electrodes together define which areas of both the liquid crystal layer and the electroluminescent layer can be selected to be switched "on" or "off".

In addition, the back electrode layer may be covered with a protective film (not shown here).

Figure 2:
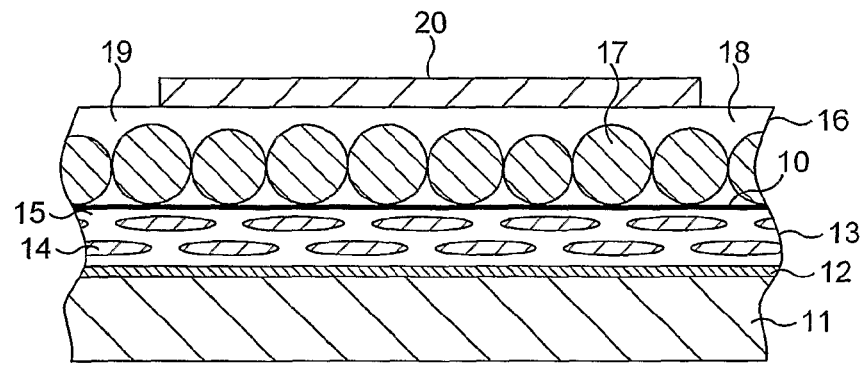
FIG. 2 shows a section through a hybrid LC/EL display according to a second embodiment of the invention.

In an alternative embodiment shown in FIG. 2 of the accompanying drawings, the EL and LC materials are not directly formed on one another, but are instead separated by an insulating interlayer 10. In all other aspects, the embodiments are the same and common reference numerals have been used.

Figure 3:
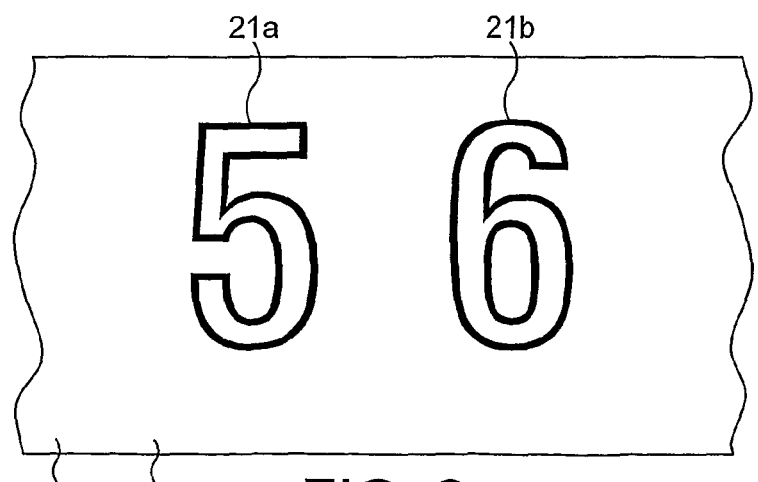
FIG. 3 shows a hybrid LC/EL display according to either embodiment, in plan view.

In either case with or without the interlayer 10, the EL and LC materials can share the common pair of electrodes 12, 20 for common activation of the EL and LC materials. This can be used to generate a display of selectively illuminatable indicia as show schematically in FIG. 3 of the accompanying drawings. This shows how a common front electrode 12 and substrate can support multiple indicia 21a, 21b. Each indicium 21a, 21b comprises the remaining layers of the structure shown in FIG. 1 or FIG. 2 or the accompanying drawings, namely the LC layer 13, optionally the interlayer 10, the EL layer 17, the reflective insulating layer 18 and the rear electrode 20. These layers are shaped to provide selectively illuminatable elements that can be illuminated to provide indications to a user; in the present example these are the numbers "5" and "6" but could be extended to any indicia.

It should be apparent that the foregoing relates only to the preferred embodiments of the present application and that numerous changes and modification may be made herein by one of ordinary skill in the art without departing from the general spirit and scope of the invention as defined by the following claims and the equivalents thereof.

The invention claimed is:

1. A display comprising:
    an electroluminescent layer;
    a physically stabilized liquid crystal layer, the physically stabilized liquid crystal layer being an emulsion-based physically stabilized liquid crystal layer; and
    a first electrode and a second electrode arranged such that the electroluminescent layer and the physically stabilized liquid crystal layer are disposed between the first and second electrodes, and arranged such that the first and second electrodes apply an electric field across both the electroluminescent layer and the physically stabilized liquid crystal layer; wherein
    the first electrode or the second electrode that is arranged closer to the physically stabilized liquid crystal layer is optically transmissive.

2. The display according to claim 1, wherein the electroluminescent layer defines a backlight of the display.

3. The display according to claim 1, wherein the physically stabilized liquid crystal layer defines an optical shutter of the display.

4. The display according to claim 1, wherein the first electrode is a front electrode of the display and the second electrode is a back electrode of the display.

5. The display according to claim 4, further comprising a protective film arranged on the back electrode.

6. The display according to claim 1, wherein the physically stabilized liquid crystal layer comprises one of a twisted nematic liquid crystal material, a cholesteric nematic liquid crystal material, a chiral nematic liquid crystal material, a nematic curvilinear aligned phase liquid crystal material, and a dyed chiral nematic liquid crystal material.

7. The display according to claim 1, wherein the electroluminescent layer is made of one of an inorganic material, a phosphor material, a zinc sulfide material, an organic light emitting diode material, and a light-emitting polymer material.

8. The display according to claim 1, further comprising an interlayer disposed between the electroluminescent layer and the physically stabilized liquid crystal layer.

9. The display according to claim 8, wherein the interlayer is made of an electrically insulating material.

10. The display according to claim 1, wherein the physically stabilized liquid crystal layer defines a mask of the display that is arranged to be switched on in order to display information.

11. The display according to claim 1, wherein the electroluminescent layer and the physically stabilized liquid crystal layer are in direct contact with each other.

12. The display according to claim 1, wherein the electroluminescent layer and the physically stabilized liquid crystal layer are separated from each other by another layer.

13. The display according to claim 1, wherein at least one of the first electrode and the second electrode is patterned.

14. The display according to claim 1, wherein the physically stabilized liquid crystal layer includes liquid crystal material that can be switched to transmit or block light output by the electroluminescent layer without requiring a polariser.

15. The display according to claim 1, further comprising a reflective layer arranged between the electroluminescent layer and one of the first and second electrodes.

16. The display according to claim 1, wherein the physically stabilized liquid crystal layer includes oblate spheroids of liquid crystal material dispersed in a supporting matrix.

* * * * *